United States Patent [19]

Hanser et al.

[11] 3,911,758

[45] Oct. 14, 1975

[54] CIRCLE DRIVE PINION FOR MOTOR GRADER

[75] Inventors: Paul Edmund Hanser, Moline, Ill.; Thomas Edward Gebauer, Dubuque, Iowa

[73] Assignee: Deere & Company, Moline, Ill.

[22] Filed: May 3, 1974

[21] Appl. No.: 466,535

[52] U.S. Cl. .................. 74/462; 74/413; 74/434
[51] Int. Cl.² ............... F16H 55/06; F16H 1/06; F16H 55/04
[58] Field of Search ............ 74/462, 460, 457, 434, 74/413, 412 R, 435, 437

[56] References Cited
UNITED STATES PATENTS

| | | | |
|---|---|---|---|
| 1,442,018 | 1/1923 | Wendell | 74/462 X |
| 2,601,397 | 6/1952 | Hill et al. | 74/462 X |
| 3,331,258 | 7/1967 | Eckerle et al. | 74/460 |

*Primary Examiner*—Leonard H. Gerin

[57] ABSTRACT

The circle of the motor grader is driven through means of a pinion having only three teeth. The profile of the teeth is a combination of involute and hypocycloid form. The combination of these forms results in a gear mesh which satisfies the fundamental laws of gearing.

6 Claims, 3 Drawing Figures

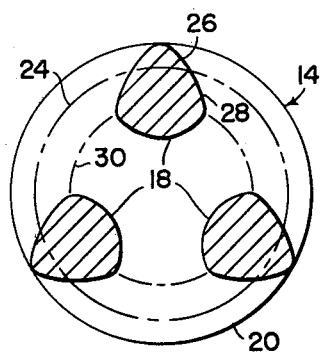
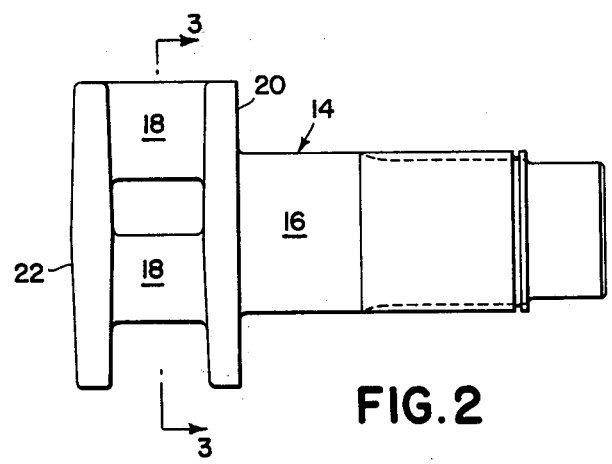

CIRCLE DRIVE PINION FOR MOTOR GRADER

BACKGROUND OF THE INVENTION

The present invention relates to the circle drive of a motor grader and more particularly relates to the gearing of an internal-gear drive.

It is a common practice in the art to rotate the circle of a grader through means of a drive including an internal gear formed on the circle and mated with a spur gear which is coupled for being driven by some sort of motor. Heretofore, the gears employed have included two forms which have necessitated that the pitch diameter be relatively large resulting in the amount of load fed back into the circle drive motor from loads imposed on the blade carried by the circle being unduly large. Further, with the pitch diameter of the pinion being relatively large, the teeth thereof are relatively small requiring that the teeth on the circle be relatively small and due to the large loads imposed on these relatively small teeth, their wear life is not as long as would be desirable.

SUMMARY OF THE INVENTION

According to the present invention, there is provided a circle drive including a novel drive pinion.

A broad object of the invention is to provide a circle drive having a pinion which has a small pitch diameter and a small number of teeth. More specifically, it is an object of the invention to provide a drive pinion having only three teeth.

Still a more specific object of the invention is to provide a three tooth pinion wherein the tooth profile is a combination of the involute and hypocycloid form, the combination of these forms being chosen such that the pinion meshes with the teeth of the circle so as to satisfy the fundamental knowledge of gearing.

A further object of the invention is to provide a drive pinion comprising three teeth which extend between and are integral with a pair of axially spaced plate-like members.

These and other objects will become apparent from a reading of the ensuing description in conjunction with the appended drawings.

BRIEF DESCRIPTION OF THE DRAWINGS

FIG. 2 is a side elevational view of the drive pinion.

FIG. 3 is a sectional view taken along the line 3—3 of FIG. 2.

DESCRIPTION OF THE PREFERRED EMBODIMENT

Figure 1:
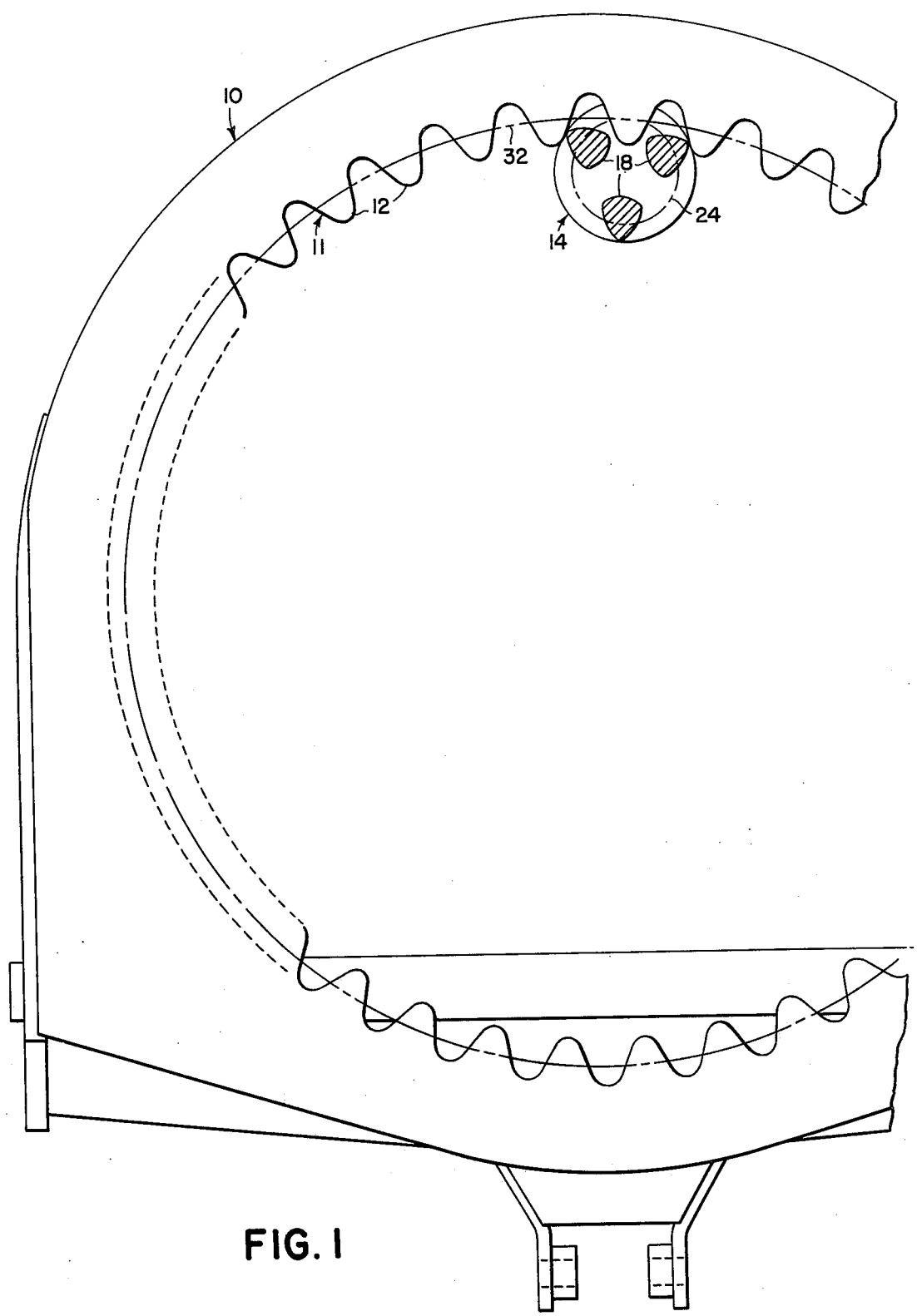
FIG. 1 is a top plan view of the circle drive embodying the present invention with the drive pinion being shown in horizontal section.

Referring now to FIG. 1, therein is shown a circle structure 10 of the type normally embodied in a motor grader for supporting the earth-working blade of the same. Formed integrally with the circle structure 10 is an annular gear 11 including a plurality of teeth 12. A drive pinion 14 is meshed with the teeth 12 of the annular gear and the pinion 14 has a shaft 16 (FIG. 2) integral therewith and adapted for connection to the drive means such as some sort of motor or the like. The pinion 14 includes three equispaced teeth 18 which extend between left and right plate-like members 20 and 22, as viewed in FIG. 2.

The profile of the teeth 18 of the pinion 14 are a combination of involute and hypocycloid form. Specifically, the teeth 18 are divided at a pitch circle 24 into involute and hypocycloid portions 26 and 28, respectively, located radially inwardly and outwardly of the pitch circle 24. The hypocycloid portions 28 terminate radially inwardly at a base circle 30.

The teeth 12 of the annular gear also, of course, have profiles which are combinations of involute and hypocycloid form so as to respectively mesh with the involute and hypocycloid portions 26 and 28 of the pinion 14.

The hypocycloid portions 28 of the pinion teeth 18 correspond to a curve traced by a point on the circumference of a circle, having a diameter equal to the pitch diameter of pinion 14, rolling internally on a circle having a diameter equal to the pitch diameter of the annular gear 11.

By way of example, a circle drive structure found to operate satisfactorily was constructed by meshing a three-tooth pinion having a pitch diameter of 5.51 inches, and outside diameter of 6.81 inches and a base diameter of 4.0 inches with a 38 tooth annular gear having a pitch diameter of 50.669 inches, a base diameter of about 52.52 inches and an inner diameter of about 47.28 inches.

The operation of the pinion 14 is thought to be evident from the foregoing discussion. Suffice it to say that the three teeth of the pinion produce continuous rotation of the circle when driving the latter, the mesh between the gears being such as to satisfy the fundamental laws of gearing. Also, due to having a small number of teeth on the drive pinion, the mating tooth on the circle can be made large. This results in a very strong tooth with good pinion-to-circle tooth engagement. Also, it is to be noted that the strength of the teeth of the pinion 14 are enhanced by the fact that they are fixed between the two plate-like members 20 to 22.

We claim:

1. In a drive pinion for driving an internal annular gear of a motor grader circle, the improvement comprising: said pinion including only three equispaced teeth; said pinion having a pitch circle which divides the profile of the teeth into radially outer and inner portions respectively of involute and hypocycloid form to thereby form tooth profiles which are a combination of involute and hypocycloid form; and said tooth profiles being dimensioned so as to satisfy the fundamental law of gearing whereby at least one tooth of the pinion will be in driving contact when the pinion is in operation.

2. The drive pinion defined in claim 1 wherein said teeth are fixed between first and second plate-like members spaced axially from each other relative to an axis defining the rotational axis of the pinion.

3. The drive pinion defined in claim 2 wherein a drive shaft is fixed to one of said plate-like members.

4. In a motor grader circle drive of the type including a drive pinion having teeth meshed with compatible teeth of an annular gear forming part of the circle frame, the improvement comprising: said pinion having a pitch circle which is no more than 11% of the size of the pitch circle of the annular gear; said pinion having only three teeth; and said three teeth having profiles shaped such that the fundamental law of gearing is satisfied whereby a constant driving force is delivered to the annular gear by the pinion during operation of the latter.

5. The circle drive defined in claim 4 wherein the three teeth of the pinion have profiles including involute formed portions extending radially outwardly from the pitch circle and hypocycloid-formed portions located radially inwardly from the pitch circle.

6. The circle drive defined in claim 4 wherein said three teeth extend between and are integral with spaced plate-like members, the respective teeth of the annular gear passing between the plate-like members during driving operation of the circle.

* * * * *